United States Patent
Knittel et al.

(10) Patent No.: US 8,208,184 B2
(45) Date of Patent: Jun. 26, 2012

(54) HOLOGRAPHIC STORAGE SYSTEM WITH IMPROVED DATA PAGE QUALITY

(75) Inventors: Joachim Knittel, Tuttlingen (DE); Frank Przygodda, Villingen (DE)

(73) Assignee: Thomson Licensing, Issy-les-Moulineaux (FR)

(*) Notice: Subject to any disclaimer, the term of this patent is extended or adjusted under 35 U.S.C. 154(b) by 270 days.

(21) Appl. No.: 12/587,182

(22) Filed: Oct. 2, 2009

(65) Prior Publication Data

US 2010/0097676 A1  Apr. 22, 2010

(30) Foreign Application Priority Data

Oct. 20, 2008  (EP) .................................. 08305703

(51) Int. Cl.
*G03H 1/10* (2006.01)
*G03H 1/12* (2006.01)
(52) U.S. Cl. ............... 359/10; 359/11; 359/29; 359/35
(58) Field of Classification Search ............ 359/11, 359/29, 30, 31, 35, 32
See application file for complete search history.

(56) References Cited

U.S. PATENT DOCUMENTS

| | | | |
|---|---|---|---|
| 3,630,593 A * | 12/1971 | Bartelt et al. | 359/3 |
| 5,719,691 A | 2/1998 | Curtis et al. | |
| 5,838,467 A | 11/1998 | Curtis et al. | |
| 6,762,865 B1 * | 7/2004 | Edwards | 359/29 |
| 7,030,978 B2 * | 4/2006 | Guetta et al. | 356/237.2 |
| 7,619,794 B2 * | 11/2009 | Baba | 359/32 |
| 2008/0123166 A1 * | 5/2008 | Szarvas et al. | 359/1 |

FOREIGN PATENT DOCUMENTS

| | | |
|---|---|---|
| EP | 1462874 A | 9/2004 |
| EP | 1720158 A | 11/2006 |
| JP | 2008/096799 | 4/2008 |

OTHER PUBLICATIONS

Hecht, Eugene, "Optics, 4th International Edition," 2002, Addison Wesley, US San Francisco, pp. 542-543.
Nickolson, Mark, "What Does the Term 'Apodization' Mean?" Mar. 6, 20007. http:/www.zemax.com/kb/articles/164/1/What-Does-the-Term-Apodization-Mean/Page1.html.
Partial European Search Report for Application No. EP 09 17 2501 dated Feb. 1, 2010.

* cited by examiner

*Primary Examiner* — Audrey Y Chang
(74) *Attorney, Agent, or Firm* — Myers Wolin, LLC

(57) ABSTRACT

A holographic storage system having an improved data page quality is described. The holographic storage system includes a special optical filter or a special light source for emphasizing the high frequency components of a reference beam and/or an object beam. This is achieved by an optical filter arranged in a Fourier plane, which has a higher attenuation at the center than at the edge. Alternatively, an adapted light source for generating the reference beam and/or the object beam is arranged in a Fourier plane. The light beam emitted by the light source has a higher intensity close to the edge than at the center.

4 Claims, 5 Drawing Sheets

HOLOGRAPHIC STORAGE SYSTEM WITH IMPROVED DATA PAGE QUALITY

This application claims the benefit, under 35 U.S.C. §119, of European Patent Application No. 08305703.4 of 20 Oct. 2008.

FIELD OF THE INVENTION

The present invention relates to a holographic storage system, and more specifically to a holographic storage system having an improved data page quality. The holographic storage system includes a special optical filter or a special light source.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array. Straightforward examples of an SLM are an amplitude SLM, where the pixels with the value '0' block the light, and the pixels with the value '1' transmit or reflect it, and a phase SLM, where the information bits '0' and '1' (or vice versa) are expressed by a phase shift of '0' and '$\pi$', respectively.

WO 2005/109410 discloses a so-called counter-propagating collinear holographic storage system. The object beam and the reference beam propagate in opposite directions and overlap in the holographic storage medium. In order to generate the counter-propagating beams the reference beam is transmitted through the holographic storage medium and impinges on a reflection type SLM, which generates the object beam by imprinting a data page onto the transmitted reference beam.

A schematic illustration of a counter-propagating system is depicted in FIG. 1. A light source 9 is used for generating the reference beam 2. The light source 9 may likewise generate the object beam, though this is not shown in the schematic illustration. The object beam 1 and the reference beam 2 overlap within the holographic storage medium 5, which is placed in or near to the Fourier plane 10 between two objective lenses 3, 4. The intensity distribution of the reference beam 2 within the holographic storage medium 5 has typically a Gaussian-like shape, as shown in FIG. 2. As a consequence, the high frequency components of the object beam 1, which are farther away from the center of the focus point, interfere with reference beam components of low intensity. In contrast, the low-frequency components of the object beam 1, which are situated closer to and at the center of the object beam 1, interfere with reference beam components of high intensity. This means that the holograms are effectively low-pass filtered during the holographic storage process.

SUMMARY OF THE INVENTION

It is an object of the invention to propose a solution for compensating for the low-pass filtering of the holograms.

According to a first aspect of the invention, this object is achieved by a holographic storage system with a light source for generating a reference beam and/or an object beam, wherein a region for holographic data storage is located in or close to a Fourier plane of the holographic storage system, with at least one optical filter arranged in a conjugate Fourier plane for modifying an intensity profile of the reference beam and/or the object beam, which is adapted to emphasize high frequency components of the reference beam and/or the object beam.

By emphasizing the high frequency components the stored data pages have an improved quality, as sharper images of the data pages are retrieved. Sharper images result in a more robust data demodulation and thus in a lower bit error rate.

Preferably, the optical filter is a transmissive filter with a transmissivity that is lower at the center of the optical filter than at the edge of the optical filter, or a reflective filter with a reflectivity that is lower at the center of the optical filter than at the edge of the optical filter. For example, the transmissivity or the reflectivity follow a parabola or a Gaussian or another profile from the center of the optical filter to the edge of the optical filter. Such types of optical filters can easily be realized and allow a rather inexpensive implementation of the invention.

According to a further aspect of the invention, this object is achieved by a holographic storage system with a light source arranged in a conjugate Fourier plane for generating a reference beam and/or an object beam, wherein a region for holographic data storage is located in or close to a Fourier plane of the holographic storage system, wherein the light source emits a reference beam and/or an object beam with an intensity which is higher close to the edge of the beam profile than at the center of the beam profile.

The use of an adapted light source has the advantage that no additional optical components are needed for implementing the invention.

Favorably, the light beam emitted by the light source has a doughnut shape. "Doughnut shape" here means that the cross section of the light beam shows a ring with a higher intensity surrounding a central area with a lower intensity.

It is rather difficult to obtain a steep decrease of the intensity at the edge of the light beam in combination with a reduced intensity at the center. A doughnut shape, i.e. a higher intensity ring with a lower intensity center, is a useful and more easily achievable implementation of the desired intensity profile.

A 4f system is needed in the holographic storage system for obtaining a conjugate Fourier plane. Such a 4f system already exists in most holographic storage systems. Therefore, adding the proposed optical filter is a simple method for improving the quality of the stored data pages. At the same time the holographic material (or the M#) is efficiently used, as a high modulation in the low-frequency region is avoided.

A method for holographic data storage has the steps of:
generating a reference beam and/or an object beam;
emphasizing high frequency components of the reference beam and/or the object beam; and
illuminating a holographic storage medium with the reference beam and/or the object beam.

As already stated before, by emphasizing the high frequency components the stored data pages have an improved quality, as sharper images of the data pages are retrieved. Sharper images result in a more robust data demodulation and thus in a lower bit error rate.

Favorably, the high frequency components of the reference beam and/or the object beam are emphasized by filtering the reference beam and/or the object beam with an optical filter as described above, or by generating the reference beam and/or the object beam with a light source as described above arranged in a Fourier plane.

Both solutions enable a rather easy and inexpensive implementation of the invention.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 3:
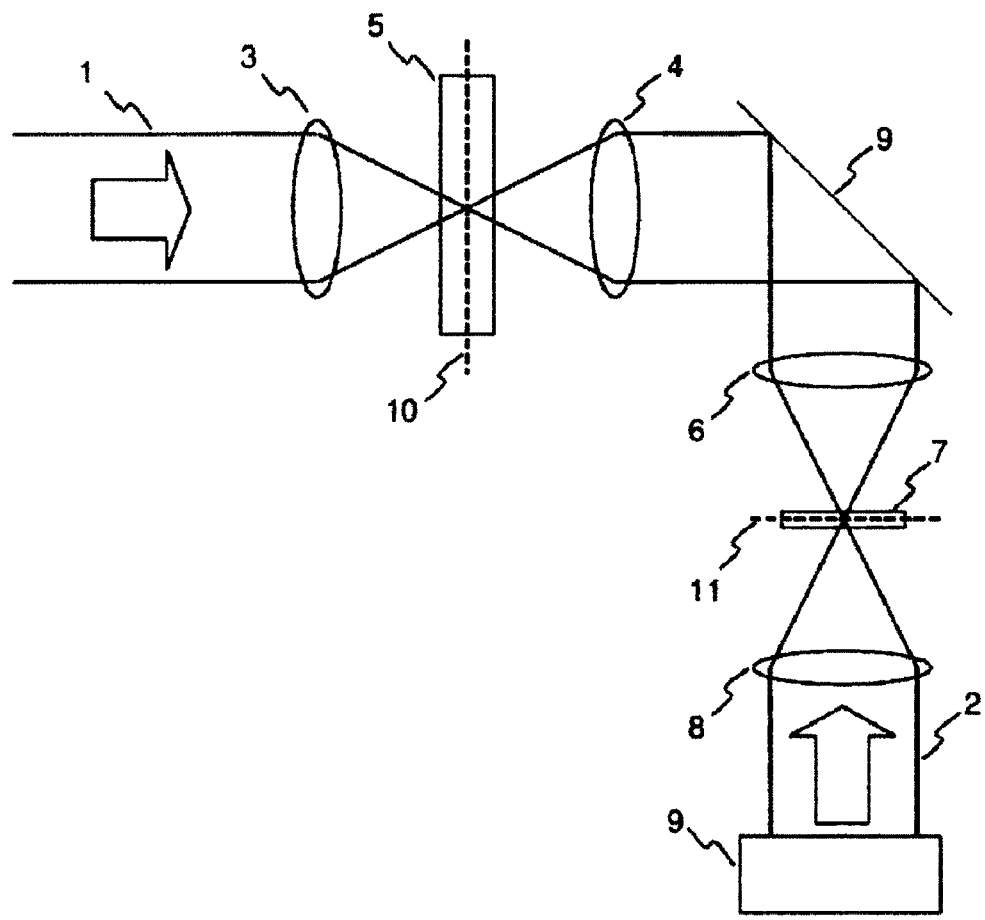
FIG. 3 depicts a holographic storage system according to the invention.

A simplified holographic storage system according to the invention is shown in FIG. 3. Though the depicted system is a counter-propagating system, the invention is not limited to this type of system. The invention is applicable to any type of holographic storage system where a low pass filtering of the Fourier components occurs.

Figure 1:
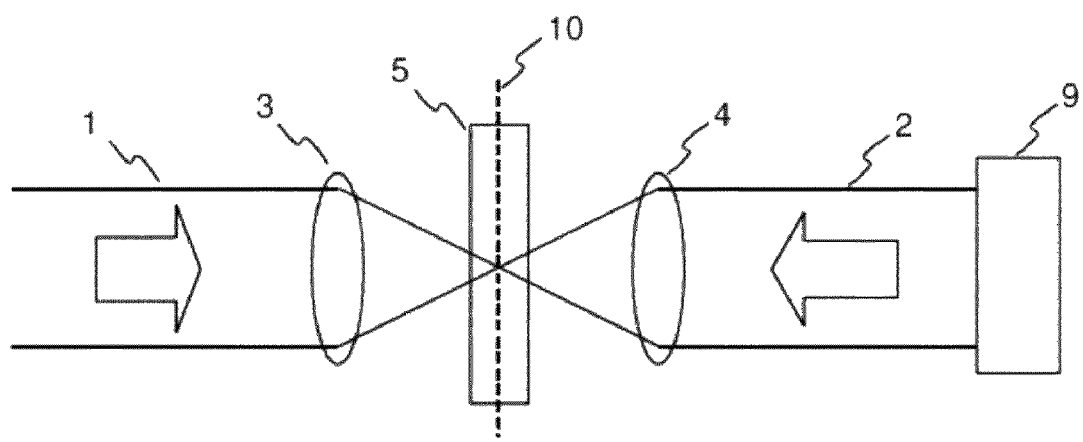
FIG. 1 schematically depicts a known counter-propagating holographic storage system.
Figure 2:
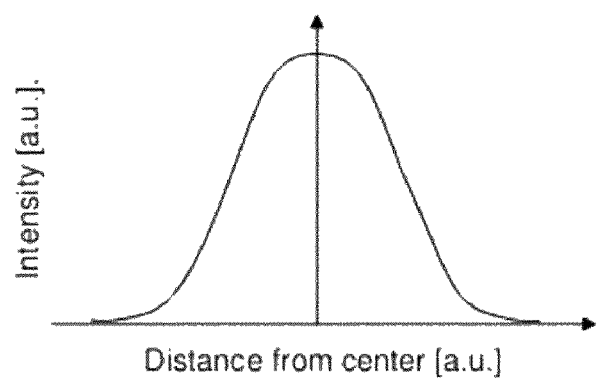
FIG. 2 shows a intensity profile of the reference beam at the position of the holographic storage medium in the system of FIG. 1.
Figure 4:
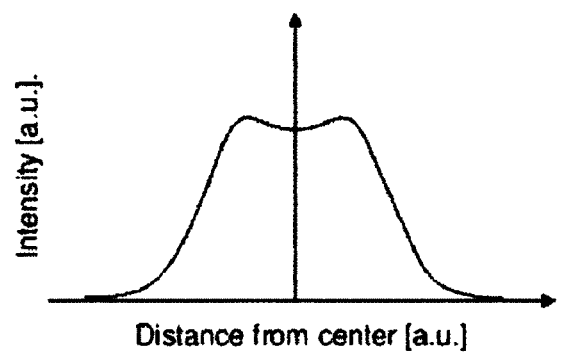
FIG. 4 shows the intensity profile of the reference beam at the position of the holographic storage medium in the system according to the invention.

The illustrated holographic storage system is largely identical to the holographic storage system shown in FIG. 1. An apodization filter 7 is placed in a conjugate Fourier plane 11 of the holographic storage medium 5. This is achieved with two additional lenses 6, 8, which form a so-called 4f imaging system. Up to a linear scaling factor the intensity distribution at the position of the holographic storage medium 5 and at the position of the apodization filter 7 are identical. The apodization filter 7 has a low transmission at the center and a high transmission farther away from the center. This transmission function modifies the intensity distribution at the position of the apodization filter 7 and, consequently, also at the position of the holographic storage medium 5. An advantageous resulting intensity distribution of the reference beam 2 is shown in FIG. 4. In this exemplary intensity distribution part of the high frequency components are boosted.

In the following the results of a simulation that demonstrate the effectiveness of the proposed invention shall be presented. In this simulation an apodizing Fourier filter is applied both to the reference beam 2 and the object beam 1.

Figure 5:
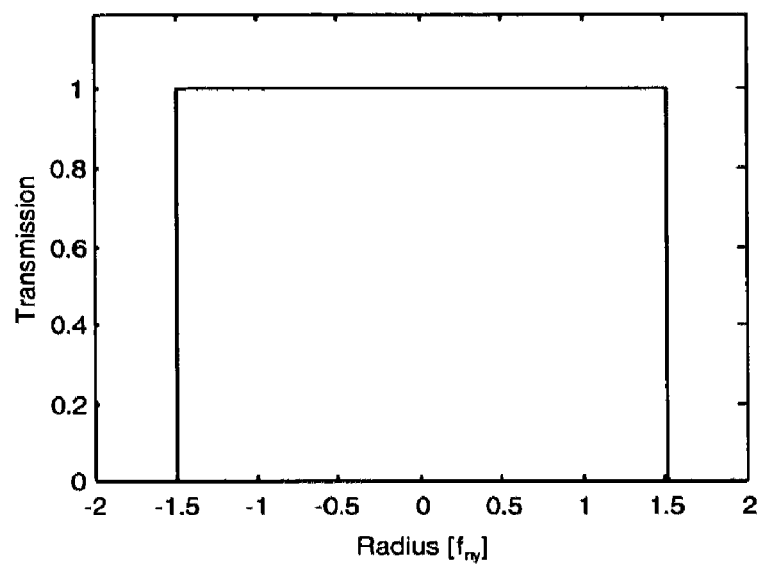
FIG. 5 illustrates the transmission profile of a conventional Fourier filter.

FIG. 5 illustrates the transmission profile of a conventional Fourier filter. The x-axis denotes the radius in the dimension of the Nyquist-frequency. The y-axis denotes the transmission. In this example the cut-off frequency of the filter is $f_{ny}=1.5$. As can be seen, the transmission is constant over the whole frequency range below the cut-off frequency.

Figure 6:
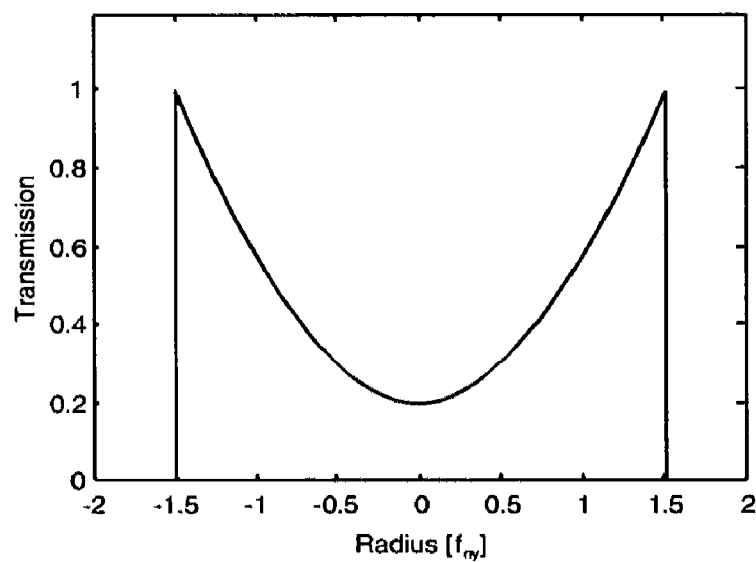
FIG. 6 depicts an apodized Fourier filter.

The transmission profile of an apodized Fourier filter 7 is depicted in FIG. 6. As before the cut-off frequency of the filter 7 is $f_{ny}=1.5$. However, the transmission is not constant over the whole frequency range below the cut-off frequency. Instead, the profile follows a parabola with a center attenuation of 80%.

Figure 7:
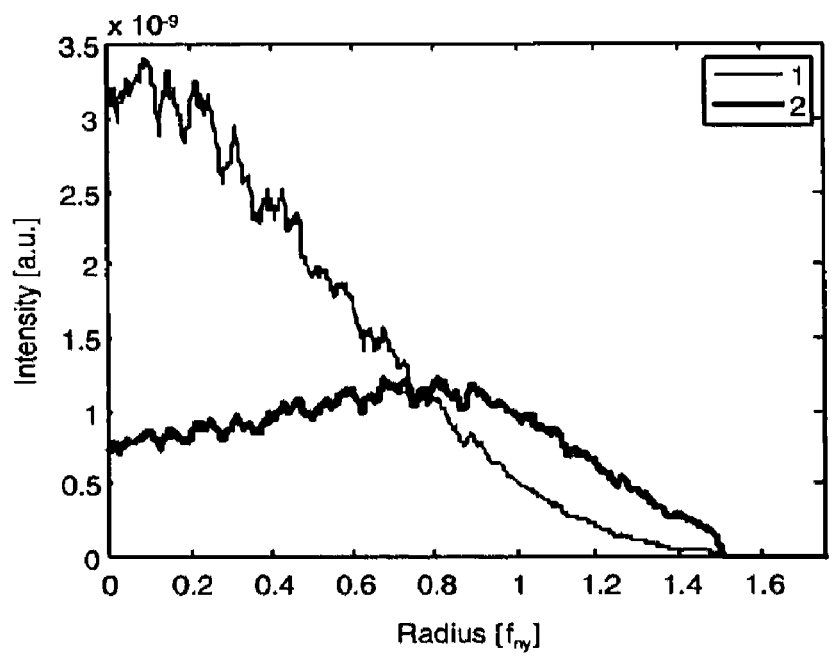
FIG. 7 shows the intensity distribution of the reference beam resulting from the Fourier filters of FIG. 5 and FIG. 6.

The intensity distribution of the reference beam 2 in the Fourier plane resulting from the Fourier filter profiles of FIG. 5 and FIG. 6 is shown in FIG. 7. Line 1 depicts the resulting intensity distribution without apodization, i.e. with a conventional Fourier filter, whereas line 2 depicts the resulting intensity distribution with an apodized Fourier filter. Both intensity distributions are normalized so that the total power in each beam is the same. Plotted is the mean intensity versus the radial position in the dimension of the Nyquist-frequency. "Mean intensity" means that the intensity is locally averaged to avoid strong modulation by speckle noise in the graph.

Figure 8:
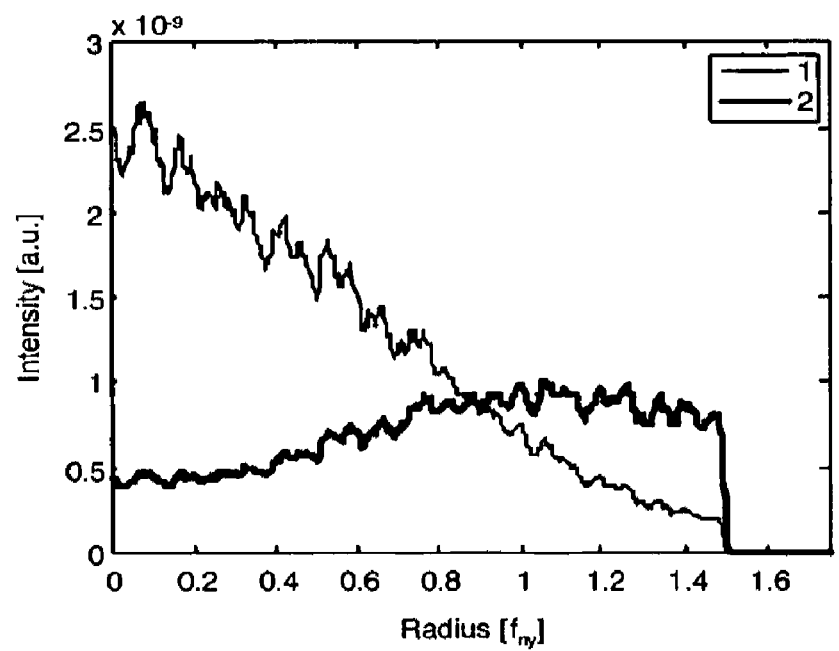
FIG. 8 shows the intensity distribution of the object beam resulting from the Fourier filters of FIG. 5 and FIG. 6.

The intensity distribution of the object beam in the Fourier plane resulting from the Fourier filter profiles of FIG. 5 and FIG. 6 is shown in FIG. 8. As in FIG. 7 line 1 depicts the resulting intensity distribution without apodization, whereas line 2 depicts the resulting intensity distribution with an apodized Fourier filter 7. Plotted is the mean intensity versus the radial position in the dimension of the Nyquist-frequency. As can be seen, higher spatial frequencies are enhanced by the apodized Fourier filter compared with the conventional filter.

Figure 9:
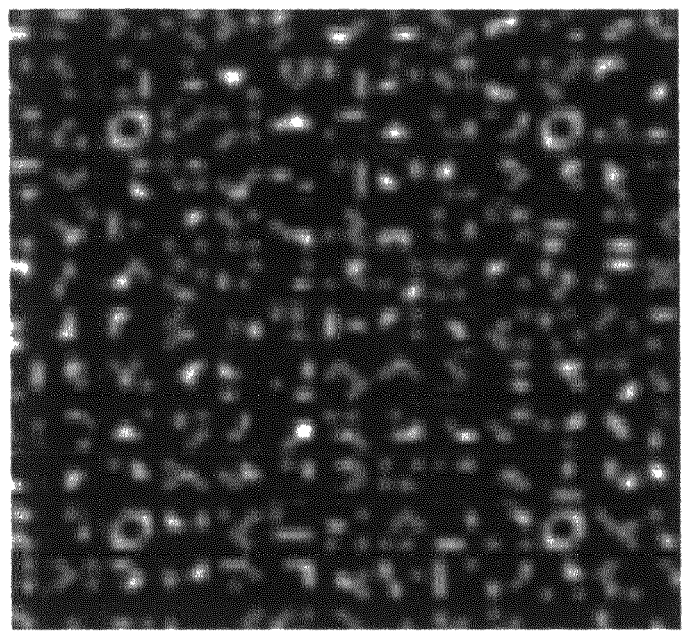
FIG. 9 depicts a simulated read-out data page without apodization.
Figure 10:
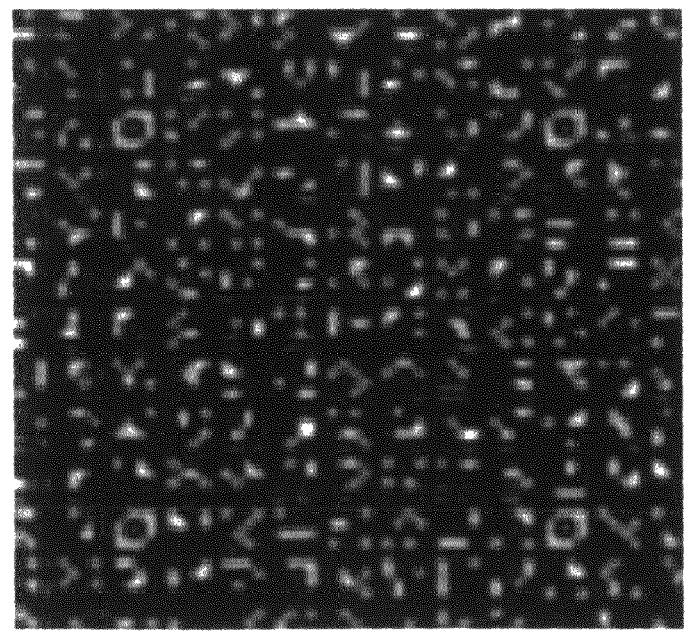
FIG. 10 shows a simulated read-out data page with an apodized Fourier filter inserted in the paths of the object beam and the reference beam.

FIG. 9 depicts a simulated read-out data page without apodization, i.e. with a conventional Fourier filter. FIG. 10 shows a simulated read-out data page with an apodized Fourier filter inserted in the paths of the object beam 1 and the reference beam 2. The image with the apodized Fourier filter is sharper because of the emphasis of the high frequencies. The sharper image can be decoded with a lower bit error rate.

What is claimed, is:

1. A holographic storage system, the system comprising:
a light source for generating a reference beam or an object beam,
a first objective lens for illuminating the reference beam or the object beam into a holographic storage medium, a region for holographic data storage of the holographic storage medium being located in or close to a Fourier plane of the objective lens,
a 4f imaging system comprising a second objective lens and a third objective lens, at least one optical filter being arranged in a Fourier plane of the 4f imaging system for modifying an intensity profile of the reference beam or the object beam, wherein the optical filter is a transmissive filter with a transmissivity that increases from a lower value at the center of the optical filter to a higher value at the edge of the optical filter, or a reflective filter with a reflectivity that increases from a lower value at the center of the optical filter to a higher value at the edge of the optical filter.

2. The holographic storage system according to claim 1, wherein the transmissivity follows a parabola from the center of the optical filter to the edge of the optical filter or the reflectivity follows a parabola from the center of the optical filter to the edge of the optical filter.

3. A method for holographic data storage, the method comprising:
generating a reference beam or an object beam;
modifying an intensity profile of the reference beam or the object beam with at least one optical filter arranged in a Fourier plane of a 4f imaging system, wherein the optical filter is a transmissive filter with a transmissivity that increases from a lower value at the center of the optical filter to a higher value at the edge of the optical filter, or a reflective filter with a reflectivity that increases from a lower value at the center of the optical filter to a higher value at the edge of the optical filter; and
illuminating a holographic storage medium with the reference beam or the object beam using a first objective lens, a region for holographic data storage of the holographic storage medium being located in or close to a Fourier plane of the objective lens.

4. The method according to claim 3, wherein the transmissivity follows a parabola from the center of the optical filter to the edge of the optical filter or the reflectivity follows a parabola from the center of the optical filter to the edge of the optical filter.

* * * * *